(12) United States Patent
Detmer

(10) Patent No.: US 11,734,089 B2
(45) Date of Patent: Aug. 22, 2023

(54) DYNAMIC OPTION RESELECTION IN VIRTUAL ASSISTANT COMMUNICATION SESSIONS

(71) Applicant: FMR LLC, Boston, MA (US)

(72) Inventor: Allen Detmer, Patriot, IN (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 17/962,091

(22) Filed: Oct. 7, 2022

(65) Prior Publication Data

US 2023/0110140 A1 Apr. 13, 2023

Related U.S. Application Data

(60) Provisional application No. 63/262,379, filed on Oct. 11, 2021.

(51) Int. Cl.
*G06F 9/54* (2006.01)
*G06F 3/0482* (2013.01)
*H04L 51/02* (2022.01)

(52) U.S. Cl.
CPC ............ *G06F 9/542* (2013.01); *G06F 3/0482* (2013.01); *H04L 51/02* (2013.01)

(58) Field of Classification Search
CPC .... G06F 9/542; G06F 16/1734; G06F 3/0482; H04L 51/02
See application file for complete search history.

(56) References Cited

U.S. PATENT DOCUMENTS

| | | | |
|---|---|---|---|
| 6,446,120 B1 | 9/2002 | Dantressangle | |
| 7,228,278 B2 | 6/2007 | Nguyen et al. | |
| 9,172,747 B2 | 10/2015 | Walters et al. | |
| 9,318,108 B2 | 4/2016 | Gruber et al. | |
| 10,109,297 B2 | 10/2018 | Brown et al. | |
| 10,127,224 B2 | 11/2018 | DeLeeuw | |
| 10,313,404 B2 | 6/2019 | Ein-Gil et al. | |
| 10,452,695 B2 | 10/2019 | Rodgers | |
| 10,795,640 B1 * | 10/2020 | Knight | G06F 3/167 |
| 10,902,533 B2 * | 1/2021 | McConnell | G06F 16/3329 |

(Continued)

OTHER PUBLICATIONS

"Gathering information with slots," IBM Cloud Docs / Watson Assistant (Managed), retrieved from https://cloud.ibm.com/docs/assistant?topics=assistant-dialog-slots on Feb. 16, 2021, 12 pages.

*Primary Examiner* — Andy Ho

(74) *Attorney, Agent, or Firm* — Cesari & McKenna, LLP

(57) ABSTRACT

Methods and apparatuses are described for dynamic option reselection in virtual assistant (VA) communication sessions. A chat session is established between a VA application and a remote computing device. The VA application captures a first conversation intent generated by a user of the remote device, where the first conversation intent is part of a first workflow. The VA application generates an option selection feature based upon the first conversation intent, comprising a plurality of options and associated with a reference identifier. The VA application receives a selection of a first option in the option selection feature from the remote device. The VA application initiates a second workflow in response to the selected. The VA application detects a selection of a second option in the option selection feature from the remote device and restores the chat session to a state in the first workflow using the reference identifier.

20 Claims, 11 Drawing Sheets

(56) References Cited

U.S. PATENT DOCUMENTS

| | | | |
|---|---|---|---|
| 11,196,863 B2* | 12/2021 | Spohrer | G06N 5/043 |
| 11,379,446 B1 | 7/2022 | Detmer et al. | |
| 11,463,387 B1 | 10/2022 | Panati et al. | |
| 11,468,282 B2* | 10/2022 | Sanghavi | G06Q 10/10 |
| 2003/0132958 A1 | 7/2003 | Himmel et al. | |
| 2012/0041903 A1 | 2/2012 | Beilby et al. | |
| 2014/0279050 A1 | 9/2014 | Makar et al. | |
| 2016/0094492 A1 | 3/2016 | Li et al. | |
| 2017/0148073 A1 | 5/2017 | Nomula et al. | |
| 2017/0324867 A1 | 11/2017 | Tamblyn et al. | |
| 2018/0131643 A1 | 5/2018 | Trufinescu et al. | |
| 2018/0337872 A1 | 11/2018 | Fawcett | |
| 2019/0089655 A1 | 3/2019 | Uppala et al. | |
| 2019/0095524 A1 | 3/2019 | Rodgers | |
| 2019/0188590 A1 | 6/2019 | Wu et al. | |
| 2019/0258456 A1 | 8/2019 | Byun et al. | |
| 2019/0311036 A1 | 10/2019 | Shanmugam et al. | |
| 2020/0005118 A1* | 1/2020 | Chen | G06F 16/3329 |
| 2020/0007380 A1 | 1/2020 | Chen et al. | |
| 2020/0081939 A1 | 3/2020 | Subramaniam | |
| 2020/0364300 A1 | 11/2020 | Tan et al. | |
| 2021/0004390 A1 | 1/2021 | Li et al. | |
| 2021/0035576 A1* | 2/2021 | Kang | G10L 15/183 |
| 2021/0142009 A1 | 5/2021 | Detmer et al. | |
| 2021/0312904 A1* | 10/2021 | Shukla | G06F 8/38 |

\* cited by examiner

DYNAMIC OPTION RESELECTION IN VIRTUAL ASSISTANT COMMUNICATION SESSIONS

RELATED APPLICATIONS

This application claims priority to U.S. Provisional Patent Application No. 63/262,379, filed on Oct. 11, 2021, the entirety of which is incorporated herein by reference.

TECHNICAL FIELD

This application relates generally to methods and apparatuses, including computer program products, for dynamic option reselection in virtual assistant communication sessions.

BACKGROUND

As computing technology has become commonplace, many users have abandoned the use of live telephone conversations with service agents and representatives to answer questions and resolve issues, in favor of electronic communications such as text-based online chat sessions over the Internet that involve the use of computing devices and related chat-based software. In order to efficiently manage this form of communication, many organizations are turning to automated conversation service software applications (such as virtual assistants and chatbots) to interact with end users intelligently using advanced language processing and data interpretation techniques. Many times, a conversation service software application can either resolve the end user's inquiry altogether or sufficiently identify the intent behind the end user's inquiry so that the chat-based communication session can be routed to a live customer service agent best equipped to handle the end user's request.

In some scenarios, a conversation service software application can provide a user with the ability to select from a plurality of options in response to a user request. For example, if a user indicates a particular intent (e.g., "I want to order food") to the conversation service software application, in response to the intent the application can insert a list of options into the conversation flow for the user to select from (e.g., "Do you want to order: Breakfast, Lunch, or Dinner?"). Upon receiving a selection of one of the options from the user, the conversation service software application can continue the conversation session with a subsequent intent workflow that is designed according to the particular option(s) chosen by the user.

However, the aforementioned conversation service software applications often lack robust mechanisms to account for changes to option selections in the current intent workflow and/or in prior intent workflow(s) during the same communication session. For example, a user may change his or her mind and desire to select a different option, or a user may have chosen an incorrect option. Often, a user will scroll back to a prior list of options and change the selection. In some instances, the user will change the option selection for a prior intent workflow, even though the user has already progressed to a different intent workflow. Current applications have difficulty in returning the conversation session to the previous state at which the list of options was originally presented to the user, which can lead to errors in the workflow and/or disjointed conversations—contributing to a poor user experience. In addition, option re-selection is typically not supported in conversation service software applications that may be implemented on multiple natural language processing (NLP) vendors or platforms. For example, an, organization may have conversation service software applications that are deployed on one or more headless channels (e.g., Google® Assistant™, Amazon® Alexa™) and also on more traditional channels, such as website or mobile application chatbots, voice response systems, etc. Typically, such systems require separate code bases and NLP vendors, which presents a lack of consistency and uniformity when attempting to implement an option re-selection feature, as certain channels may be limited in intent scope and the like.

SUMMARY

Therefore, what is needed are computerized methods and systems to overcome the above-described challenges and provide for dynamic option re-selection functionality in conversation service software applications. The techniques described herein advantageously enable conversation service software applications to associate an option selection with a particular intent workflow and/or session state, and track such associations during the course of a communication session, such that when a user modifies an option selection, the methods and systems can return the session to the corresponding intent workflow and/or conversation state to seamlessly continue the conversation without requiring the user to restart the conversation from an initial state.

The invention, in one aspect, features a computer system for dynamic option reselection in virtual assistant communication sessions. The system comprises a computing device having a memory that stores computer-executable instructions and a processor that executes the computer-executable instructions. The computing device establishes a chat-based communication session between a virtual assistant application of the computing device and a remote computing device. The virtual assistant application captures a first conversation intent generated by a user of the remote computing device during the chat-based communication session, where the first conversation intent is part of a first intent workflow. The virtual assistant application generates an option selection feature based upon the first conversation intent, the option selection feature comprising a plurality of options and associated with a reference identifier. The virtual assistant application receives a selection of a first one of the options in the option selection feature from the remote computing device. The virtual assistant application initiates a second intent workflow in response to the selected option received from the remote computing device. The virtual assistant application detects a selection of a second one of the options in the option selection feature from the remote computing device. The virtual assistant application restores the chat-based communication session to a state in the first intent workflow using the reference identifier.

The invention, in another aspect, features a computerized method of dynamic option reselection in virtual assistant communication sessions. A computing device establishes a chat-based communication session between a virtual assistant application of the computing device and a remote computing device. The virtual assistant application captures a first conversation intent generated by a user of the remote computing device during the chat-based communication session, where the first conversation intent is part of a first intent workflow. The virtual assistant application generates an option selection feature based upon the first conversation intent, the option selection feature comprising a plurality of options and associated with a reference identifier. The virtual assistant application receives a selection of a first one of the options in the option selection feature from the remote computing device. The virtual assistant application initiates a second intent workflow in response to the selected option received from the remote computing device. The virtual assistant application detects a selection of a second one of the options in the option selection feature from the remote computing device. The virtual assistant application restores the chat-based communication session to a state in the first intent workflow using the reference identifier.

Any of the above aspects can include one or more of the following features. In some embodiments, the virtual assistant application is activated upon launching a parent software application and waits for the user of the computing device to interact with the virtual assistant application before establishing the chat-based communication session with the remote computing device. In some embodiments, the parent software application comprises an event manager that listens for the first conversation intent. In some embodiments, the event manager detects the first conversation intent, the event manager makes the first conversation intent available to one or more applications that are subscribed to receive the first conversation intent.

In some embodiments, the first intent workflow and the second intent workflow each comprises one or more conversation states that require the user of the computing device to select from a list of options. In some embodiments, the option selection feature comprises a visual menu that displays the plurality of options on a screen of the computing device in a text chat window. In some embodiments, the selection of a first one of the options in the option selection feature comprises a text message input by the user that corresponds to the first one of the options in the option selection feature. In some embodiments, when the text message input by the user does not correspond to any of the options in the option selection feature, the virtual assistant application redisplays the visual menu to the user.

In some embodiments, the option selection feature comprises one or more sound files that, when played back by the computing device, announce the plurality of options via a speaker of the computing device. In some embodiments, the reference identifier uniquely identifies the option selection feature across a plurality of different intent workflows.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
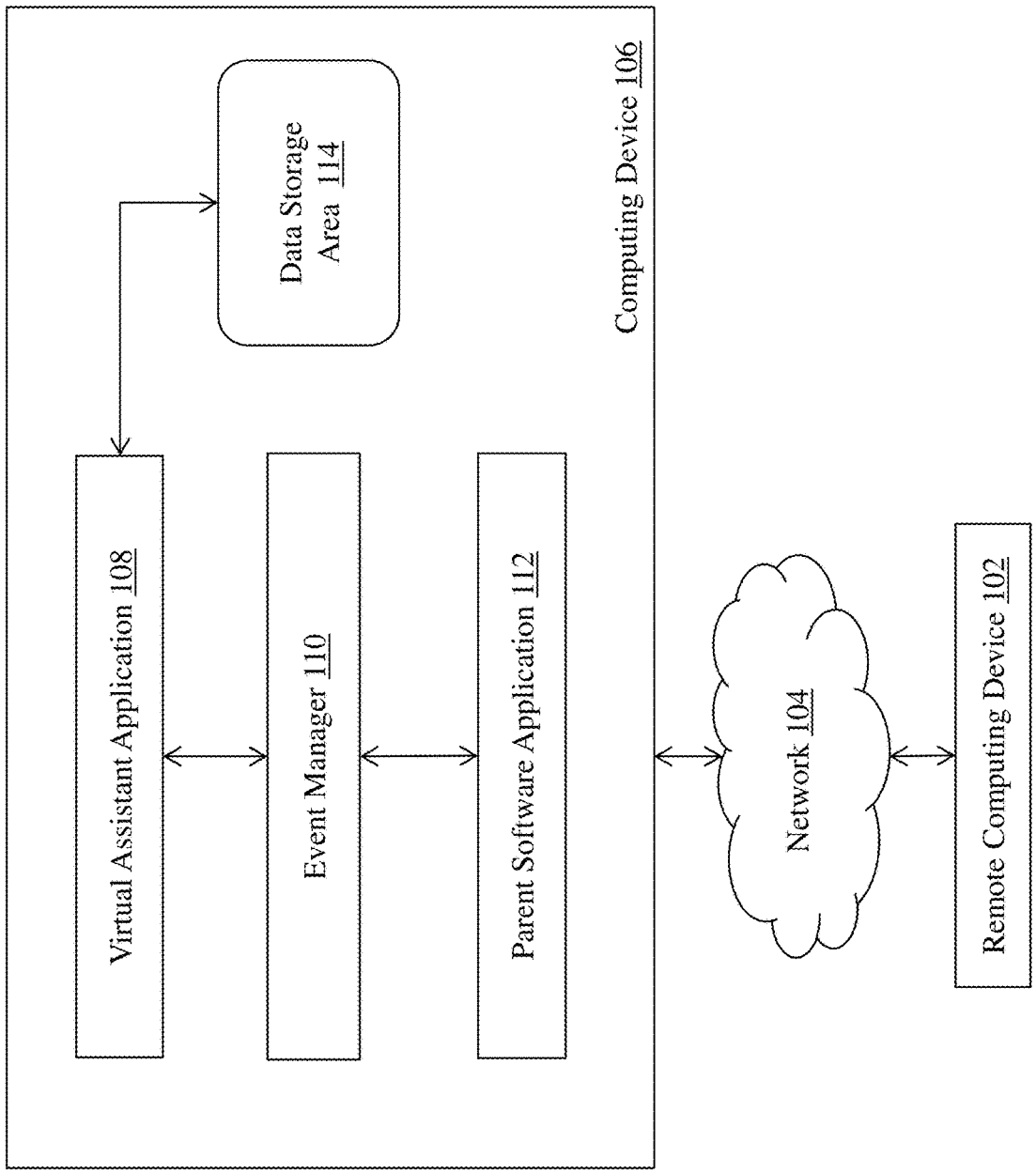
FIG. 1 is a block diagram of a system for dynamic option reselection in virtual assistant communication sessions.

FIG. 1 is a block diagram of a system 100 for dynamic option reselection in virtual assistant communication sessions. The system 100 includes a remote computing device 102, a communications network 104, a computing device 106 that includes a virtual assistant application 108, a parent software application 110, an event manager 112, and a data storage area 114.

The remote computing device 102 connects to one or more communications networks (e.g., network 104) in order to communicate with the computing device 106 to provide input and receive output relating to one or more chat-based communication sessions as described herein. It should be appreciated that chat-based communications sessions can include, but are not limited to, text-based communications (e.g., chat messages) and/or spoken communications (e.g., voice commands). Exemplary remote computing devices 102 include but are not limited to server computing devices, desktop computers, laptop computers, tablets, mobile devices, smartphones, and the like. It should be appreciated that other types of computing devices that are capable of connecting to the components of the system 100 can be used without departing from the scope of invention. Although FIG. 1 depicts one remote computing device 102, it should be appreciated that the system 100 can include any number of remote computing devices.

In some embodiments, the remote computing device 102 is configured with chat application software, which enables the remote computing device 102 to establish a chat-based communication session with the computing device 106 via the virtual assistant application 108 and/or the parent software application 112 of computing device 106.

The communications network 104 enables the remote computing device 102 to communicate with the computing device 106. The network 104 is typically comprised of one or more wide area networks, such as the Internet and/or a cellular network, and/or local area networks. In some embodiments, the network 104 is comprised of several discrete networks and/or sub-networks (e.g., cellular to Internet).

The computing device 106 is a device including specialized hardware and/or software modules that execute on a processor and interact with memory modules of the computing device 106, to receive data from other components of the system 100, transmit data to other components of the system 100, and perform functions for providing dynamic option reselection in virtual assistant communication sessions as described herein. Exemplary computing devices 106 include but are not limited to desktop computers, laptop computers, tablets, mobile devices, smartphones, and the like. The computing device 106 includes a virtual assistant application 108, a parent software application 110, and an event manager 112 that execute on the processor of the computing device 106. In some embodiments, the modules 108, 110, 112 are specialized sets of computer software instructions programmed onto one or more dedicated processors in the computing device.

As can be appreciated, in some embodiments the virtual assistant application 108 comprises a conversation service software application (i.e. chatbot, interactive voice response (IVR) module, virtual assistant) configured to automatically interact with a user at computing device 106 and/or remote computing device 102 in order to gather information and/or respond to inquiries. An exemplary conversation service application can be based upon a natural language processing (NLP) architecture which intelligently parses text messages received from client computing devices to understand the context of the message and how to best respond to it. In some embodiments, the virtual assistant application 108 can establish a chat-based communication session with the remote computing device 102 to participate in a live chat session with a user at the remote computing device 102. In these embodiments, the virtual assistant application 108 provides the chat interface for the exchange of messages between the computing device 106 and remote computing device 102.

The parent software application 110 is an application that executes on the computing device 106 to provide certain functionality to a user of computing device. In some embodiments, the parent software application 110 comprises a native application installed locally on computing device 106. For example, a native application is a software application (also called an 'app') that written with programmatic code designed to interact with an operating system that is native to the computing device 106 and provide information and application functionality to a user of the computing device 106. In the example where the computing device 106 is a mobile device such as a smartphone, the native application software is available for download from, e.g., the Apple® App Store or the Google® Play Store. In some embodiments, the native application includes a software development kit (SDK) module that is executed by a processor of the computing device. In other embodiments, the parent software application 110 is a virtual assistant platform (e.g., Alexa™) that executes on a computing device (such as an IoT device) that may or may not have a display device for presenting information to a user. In still other embodiments, the parent software application 110 is a browser application that runs on the computing device 106 and connects to one or more other computing devices (e.g., web servers, databases, etc.) for retrieval and display of information and application functionality. In one example, the browser application enables the computing device 106 to communicate via HTTP or HTTPS with remote servers addressable with URLs to receive website-related content, including one or more webpages, for rendering in the browser application and presentation on a display device coupled to the computing device 106. Exemplary browser application software includes, but is not limited to, Firefox™, Chrome™, Safari™, and other similar software. The one or more webpages can comprise visual and audio content for display to and interaction with a user.

In some embodiments, the virtual assistant application 108 and the event manager 112 are modules or plug-ins (e.g., Javascript™) that are downloaded from an external source (such as a web server) as part of the rendering of the webpage in the parent software application 110 and upon rendering, the virtual assistant application 108 and the event manager are executed by the parent software application 110 to provide the functionality described herein. For example, the virtual assistant application 108 and the event manager can be embedded or linked in the code of a webpage rendered by the parent software application 110. In some embodiments, the virtual assistant application 108 is executed to render a chat window in the parent software application 110 for conducting a chat-based communication session. In some cases, the chat window is a pop-up window separate from the parent software application 110, while in other cases the chat window is embedded in a webpage displayed by the parent software application.

The virtual assistant application 108 and the parent software application are each coupled to the event manager 112, which comprises a software module configured to manage the publishing and subscribing of data events by other software modules including but not limited to the virtual assistant application 108 and the parent software application 110. In some embodiments, the event manager 112 is a JavaScript™ module that is embedded in a webpage rendered by the parent software application 110. In one example, the event manager 112 code can be part of an SDK that also includes the virtual assistant application 108. When this SDK is loaded by the parent software application 110 that hosts the virtual assistant application 108, the event manager 112 can be exposed as a global object off the browser window object.

Generally, the event manager 112 utilizes a subscription-based paradigm, where other applications 108, 110 are configured to subscribe to specific data events or event types that are made available on the event manager 112 from various sources. When a data event is raised on the event manager, any applications that subscribe to the event/event type receive the data event and perform one or more actions in response to the data event. As will be described herein, the connected applications can also raise data events and publish them to the event manager 112 for consumption by other applications that are subscribed to them, then await responses to the published events. In some embodiments, the applications 108, 110 monitor the event manager 112 (e.g., by listening for certain data events to appear) and invoke specific actions when those data events are detected. In some embodiments, due to its JavaScript framework, the event manager 112 is compatible with any of a plurality of different parent software applications 110 that may host an instance of the virtual assistant application 108.

Although the applications 108, 110 and event manager 112 are shown in FIG. 1 as executing within the same computing device 106, in some embodiments the functionality of the applications 108, 110 and event manager 112 can be distributed among one or a plurality of other computing devices that are coupled to the computing device 106. As shown in FIG. 1, the computing device 106 enables the applications 108, 110 and event manager 112 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The functionality of the applications 108, 110 and event manager 112 will be described in greater detail throughout this specification.

The data storage area 114 is a memory location resident on computing device 106 (or in some embodiments, one or more other computing devices). The data storage area 114 is configured to receive, generate, and store specific segments of data relating to the process of providing dynamic option reselection in virtual assistant communication sessions as described herein. In some embodiments, the data storage area 114 is configured as part of an object resident in the virtual assistant application 108 of computing device 106 that manages the chat session with remote computing devices.

Figure 2:
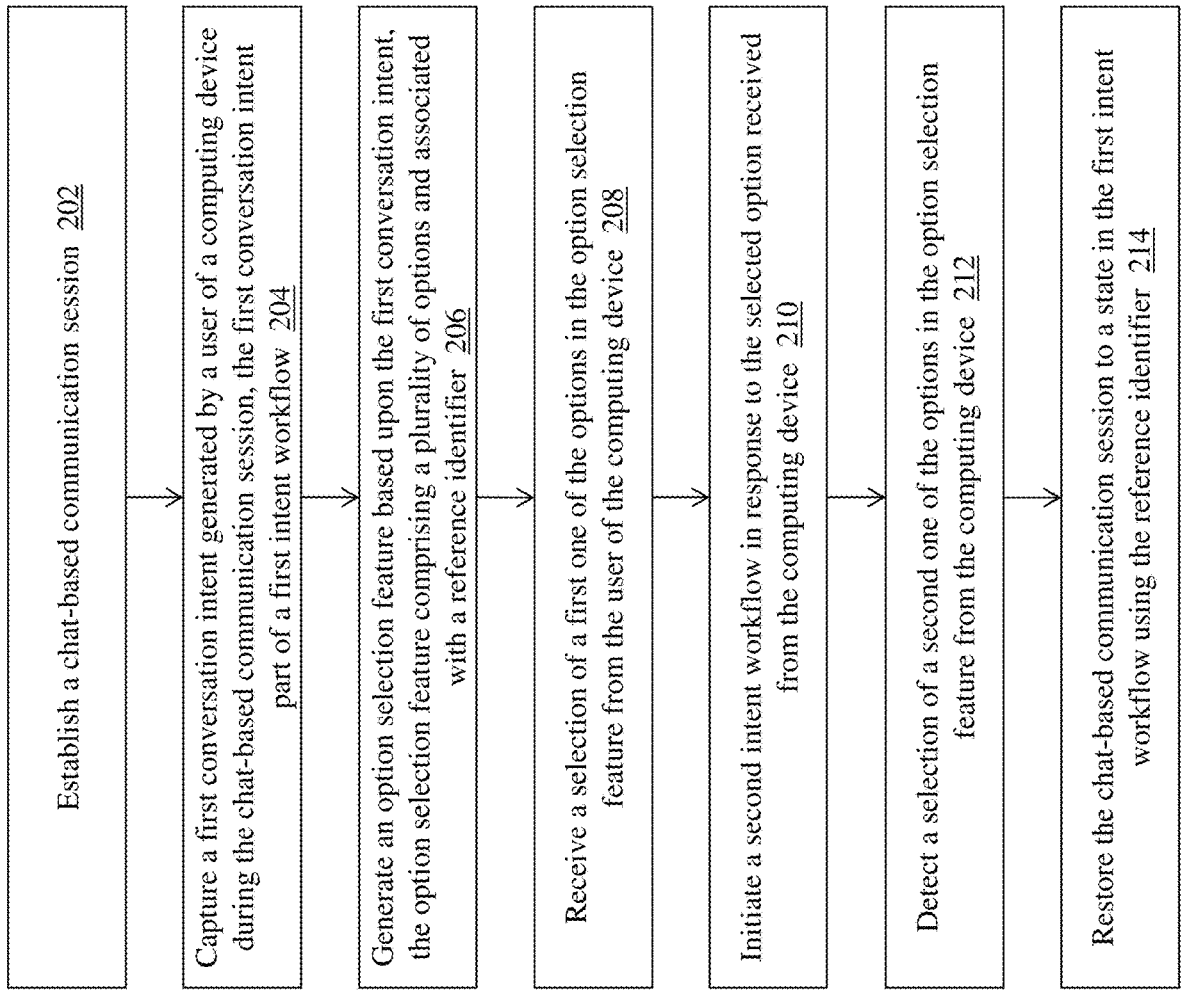
FIG. 2 is a flow diagram of a method of dynamic option reselection in virtual assistant communication sessions.

FIG. 2 is a flow diagram of a method 200 of dynamic option reselection in virtual assistant communication sessions, using the system 100 of FIG. 1. A user at computing device 106 can launch the parent software application 112 to perform a variety of tasks, including but not limited to information retrieval from local and/or remote data sources. For example, when the parent software application 112 is a browser application, the user can interact with the parent software application 112 to access one or more websites and/or webpages (either internally or externally hosted) in order to view information and submit queries for retrieval of additional information. For example, when the parent software application 112 is a native application, the user can execute the parent software application 112 to access information and communicate with one or more remote computing devices to carry out particular tasks (e.g., submit queries, place orders, and the like). In one embodiment, the user of computing device 106 is a customer accessing a company conversation service application.

At some point after launching the parent software application 112, the computing device 106 establishes (step 202) a chat-based communication session with remote computing device 102 via the virtual assistant application 108. In some embodiments, the virtual assistant application 108 is activated upon launching the parent software application 112 and waits for the user to interact with it (e.g., via entering a question in a chat input box, providing a spoken command, or the like) before connecting to the remote computing device 102.

In some embodiments, the event manager 110 is activated and initialized by the computing device 106 when the parent software application 112 and/or the virtual assistant application 108 is activated by the computing device 106. As mentioned above, the event manager 110 can be a component of the parent software application 112 and/or the virtual assistant application 108, or a separate software module that is coupled to the parent software application 112 and the virtual assistant application 108. In some embodiments, the event manager 110 is executed by a processor of the computing device 106 in a background thread or process and does not provide any visual elements displayed in a user interface of the computing device 106. The event manager 110 listens for conversation intents emitted by applications 108, 112 and when a conversation intent is detected, the event manager 110 can make the conversation intent available to any applications 108, 112 that are subscribed to receive the intent—as will be further explained below.

Once the event manager 110 and the virtual assistant application 108 are activated, the event manager 110 captures (step 204) a first conversation intent generated by a user of the computing device 106 during the chat-based communication session with remote computing device 102. The event manager 110 can capture the first conversation intent (e.g., as a message received from the user of the computing device). For example, the user may want to place a food takeout order using the virtual assistant application and the user can generate a first conversation intent comprising the message "I want to order food." The event manager 110 captures the first conversation intent and submits the first conversation intent to the virtual assistant application 108 to initiate and/or continue an intent workflow associated with the first conversation intent.

As can be appreciated, the intent workflow can comprise one or more conversation states that require the user to select from a list of options. At these points in the intent workflow, the virtual assistant application 108 generates (step 206) an option selection feature based upon the first conversation intent. In some embodiments, the option selection feature comprises a plurality of options from which the user can select. Using the above food takeout example, the option selection feature can comprise the following options: Breakfast, Lunch, Dinner. The option selection feature can be implemented as a visual menu displayed on a screen of the computing device 106 (e.g., in a text chat session), as a list of options audibly played to a user via a speaker of the computing device 106 (e.g., in an IVR session), and the like. The option selection feature is associated with a reference identifier that uniquely identifies the option selection feature across multiple different intent workflows. In one example, the reference identifier comprises an alphanumeric string assigned to the particular option selection feature of a given intent workflow and stored in data storage area 114.

The user of computing device 106 selects a first one of the options from the option selection feature, and the virtual assistant application 108 receives (step 208) the selection of the option from the user. For example, in a text chat session, the user may input a text message that corresponds to one of the options in the option selection feature. In certain circumstances, the user's input may not correspond to any of the options—in which case the virtual assistant application 108 can simply re-display the list of options and the user can provide another input. When the user's input corresponds to one of the options in the option selection feature, the event manager 110 captures the user's selection and initiates (step 210) a second intent workflow in the virtual assistant application 108 in response to the selected option. For example, if the user selects "Breakfast" from the option selection feature described above, the event manager 110 can determine a second intent workflow based upon the Breakfast option selection and initiate the second intent workflow in the virtual assistant application 108. Upon initiating the second intent workflow, the virtual assistant application 108 can continue the conversation session accordingly (e.g., by providing a message to the user and/or another list of options)—such as a new option selection feature containing Eggs, Pancakes, Oatmeal.

As mentioned previously, the user at computing device 106 may decide to change the option that he or she selected in a previous option selection feature. Continuing with the above example, the user may scroll up in the text chat session window of the virtual assistant application 108 to the option selection feature containing Breakfast, Lunch, Dinner and change the selected option from Breakfast to Dinner. The event manager 110 can detect (step 212) the selection of a different one of the options in the option selection feature. For example, the virtual assistant application 108 can transmit a notification to the event manager 110 that the user changed the selected option in an option selection feature previously presented during the conversation session, even if the option selection feature was part of a different intent workflow. Because each option selection feature is associated with a unique reference identifier, the event manager 110 identifies a conversation state for the option selection feature (either in the current intent workflow or a prior intent workflow) using the reference identifier.

The event manager 110 restores (step 214) the chat-based communication session to a conversation state using the reference identifier associated with the option selection feature for the changed option. Continuing with the above example, when the user selects Dinner, the event manager 110 detects the change in selection, captures the reference identifier for the option selection feature, identifies an intent workflow and/or conversation state corresponding to the reference identifier, and restores the chat-based communication session in the virtual assistant application 108 to a state at which the option selection feature was presented to the user. In one example, the event manager 110 can refresh the virtual assistant application 108 to display the option selection feature and confirm that the user wants to change the selection. In another example, the event manager 110 can refresh the virtual assistant application 108 and initiate a different intent workflow based upon the change in selection.

It should be appreciated that using the techniques described herein, the system 100 can dynamically conduct a conversation session with a user throughout multiple option selections and re-selections, no matter where in the intent workflow and/or conversation session the option selection was originally made. Also, the system 100 beneficially manages the conversation state for the session so that the user is provided with a contiguous conversation experience without having to restate an intent, start over from the beginning of the conversation, or the like.

Another feature of the technology described herein is to maintain a replay queue of conversation intents provided by the user of computing device 106 so that the virtual assistant application 108 and event manager 110 can restore a conversation session to a particular state based upon one or more changes to option selections. For example, the event manager 110 can store a replay queue containing each of the user selections and/or responses in one or more intent workflows for retrieval in restoring the conversation state. When a change in option selection is detected, the event manager 110 can utilize the replay queue to maintain any option selections that occurred prior to the changed selection so that the conversation state can be restored quickly and remain customized to the particular user's selections. It should be appreciated, however, that for certain types of conversations (such as transactional conversations), the virtual assistant application 108 and event manager 110 can be prevented from providing the option reselection feature at a certain point during the intent workflow. For example, after a user has executed an order, the system 100 can prevent the user from, e.g., scrolling back up to a prior option selection feature and selecting a different option.

Figure 3:
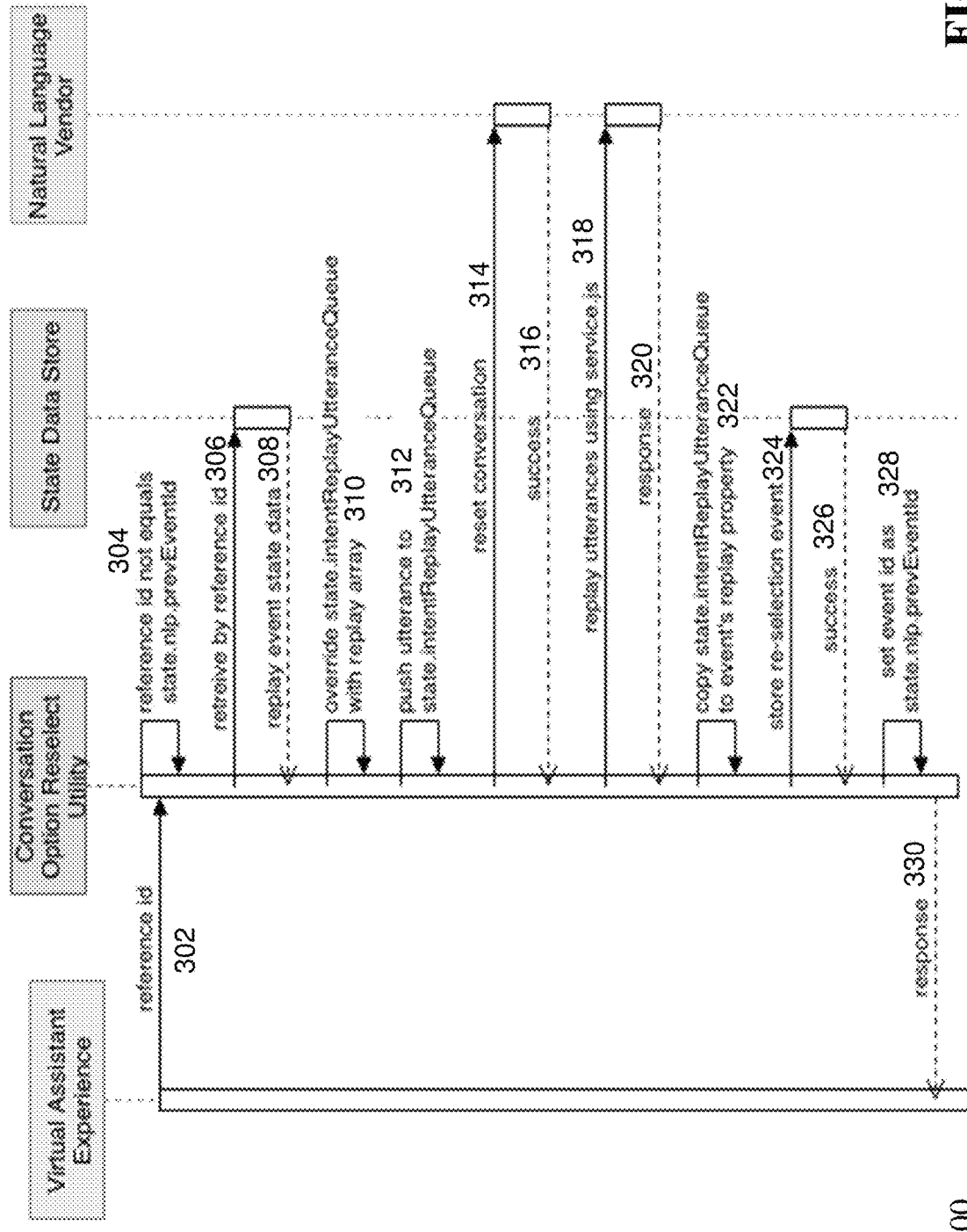
FIG. 3 is a workflow diagram of a method for dynamic option reselection in virtual assistant communication sessions.

FIG. 3 is a workflow diagram of a method 300 for dynamic option reselection in virtual assistant communication sessions, using the system 100 of FIG. 1. As shown in FIG. 3, when the virtual assistant application 108 and/or event manager 110 detects a change in options, the reference identifier is captured (302) and the event manager 110 determines that the reference identifier does not equal the previous conversation state (304). The event manager 110 retrieves the option selection feature and replay queue for the session based upon the reference identifier (306) and replays the conversation using the event state data (308).

The event manager 110 overrides the conversation state using the replay queue (310) and provides the prior option selection feature to the conversation session (312). The event manager 110 then resets the conversation with the NLP platform (314) and receives confirmation of the reset from the NLP platform (316). The event manager 110 then replays the option selection feature in the NLP platform (318) and receives a response from the NLP platform (320). The event manager 110 then copies the conversation state queue to the replay queue (322) and stores the reselection event (324) in data storage area 114, which returns a confirmation (326). The event manager 110 then sets the event id in the virtual assistant application 108 as the previous event id (328) and returns the response (e.g., comprising the option selection feature) to the virtual assistant application 108.

Figure 4:
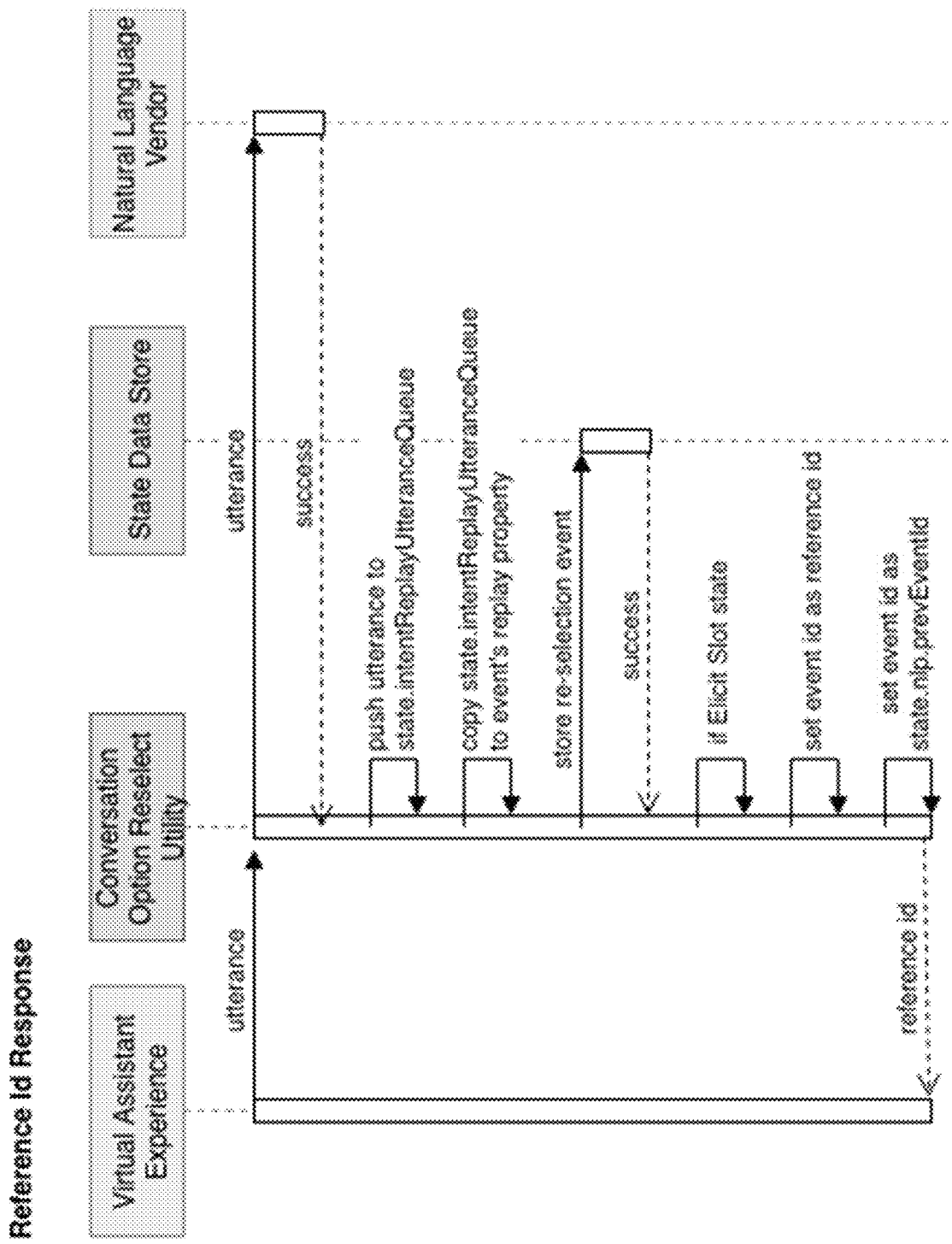
FIG. 4 is a workflow diagram of a method for restoring a conversation based upon an option reselection.
Figure 5:
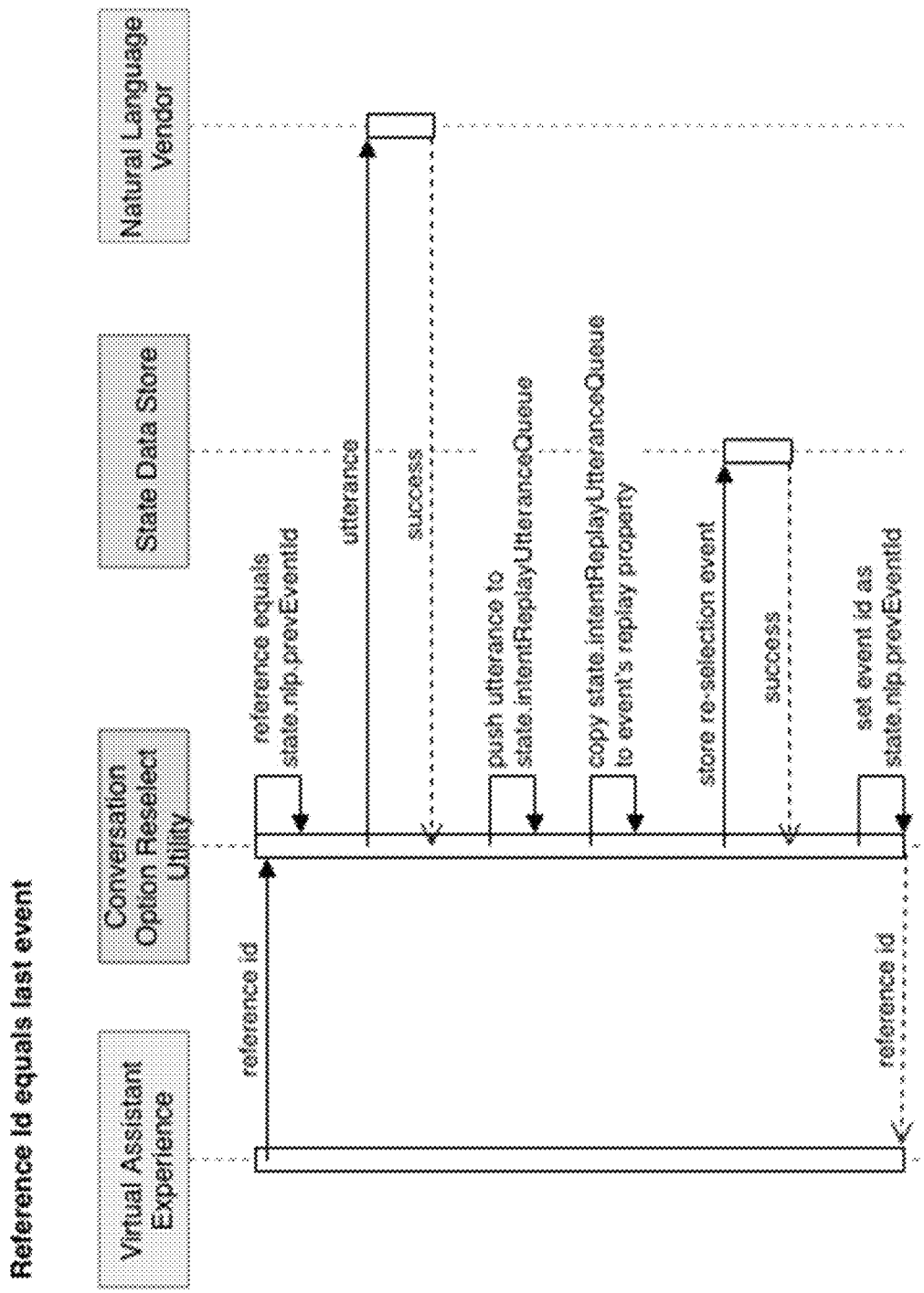
FIG. 5 is a workflow diagram of a method for dynamic option reselection in virtual assistant communication sessions where the reference identifier matches the previous event.
Figure 6:
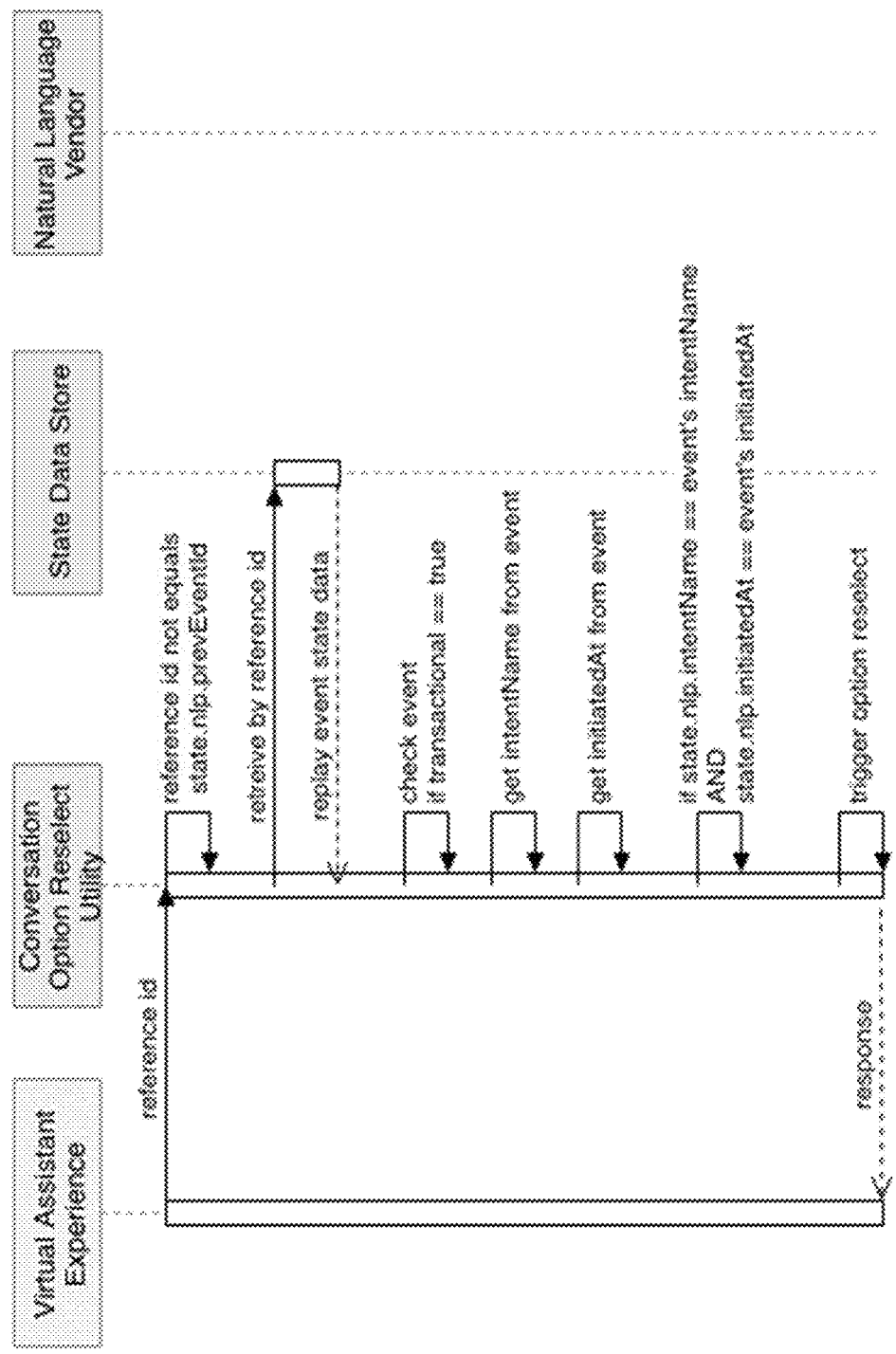
FIG. 6 is a workflow diagram of a method for enabling option reselection in a transactional conversation.
Figure 7:
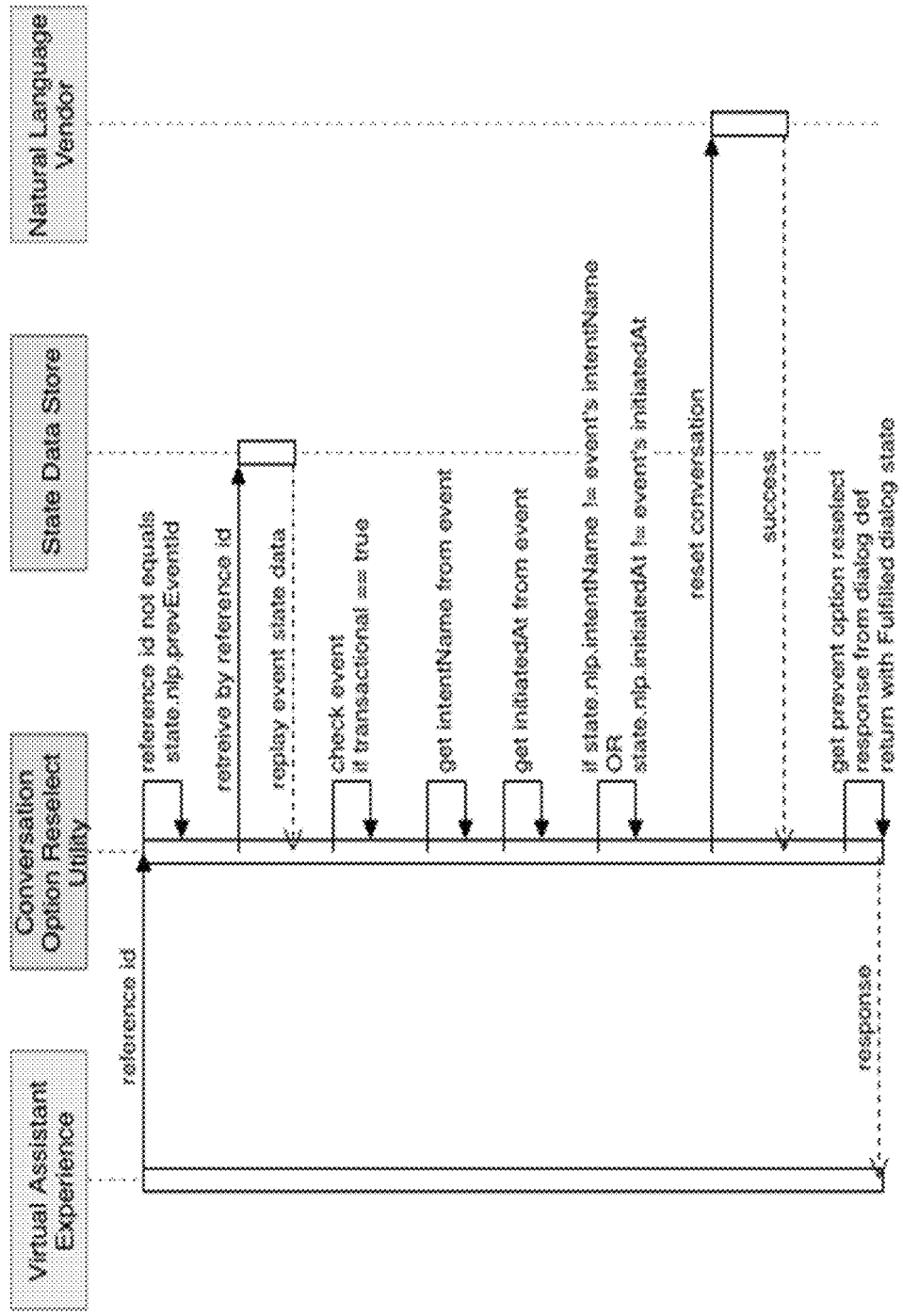
FIG. 7 is a workflow diagram of a method for preventing option reselection in a transactional conversation.

FIGS. 4-7 comprise workflow diagrams of certain methods relating to dynamic option reselection in virtual assistant communication sessions using the system 100 of FIG. 1. FIG. 4 is a workflow diagram of a method 400 for restoring a conversation based upon an option reselection. FIG. 5 is a workflow diagram of a method 500 for dynamic option reselection in virtual assistant communication sessions where the reference identifier matches the previous event. FIG. 6 is a workflow diagram of a method 600 for enabling option reselection in a transactional conversation. FIG. 7 is a workflow diagram of a method 700 for preventing option reselection in a transactional conversation.

Figure 8:
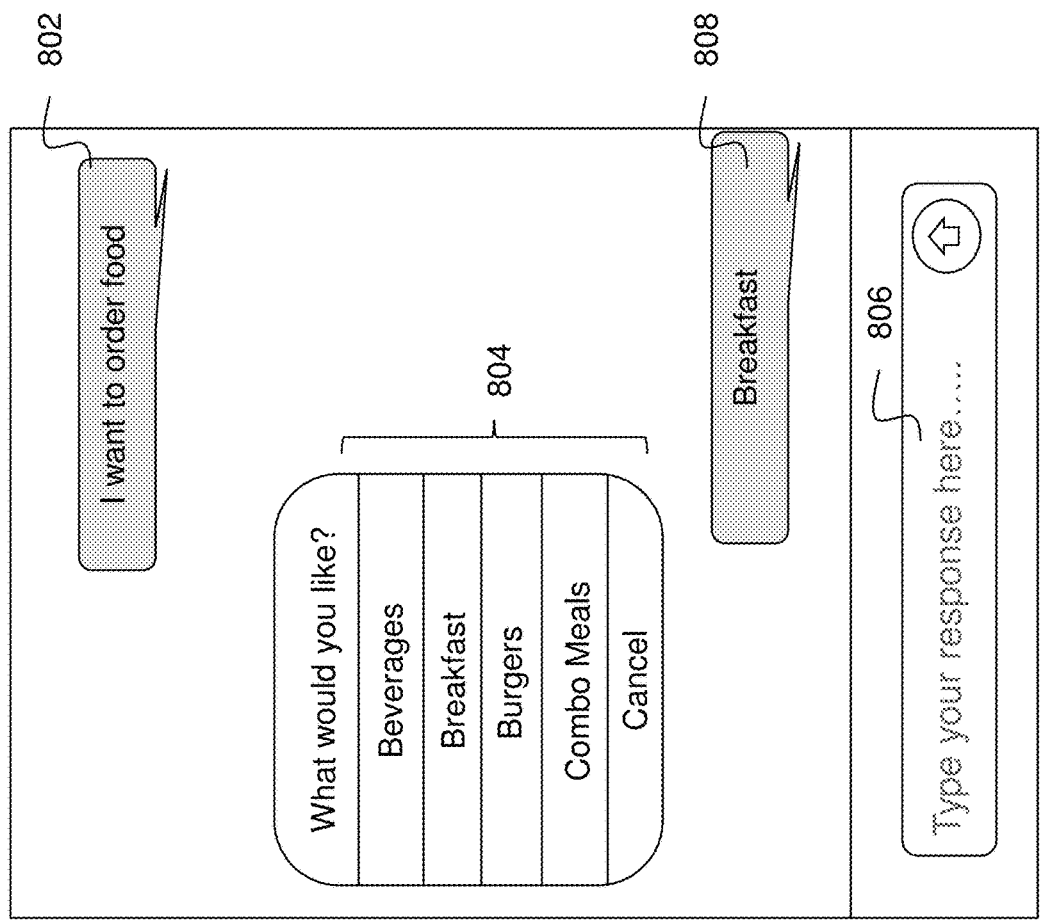
FIGS. 8-11 are screenshots of a virtual assistant user interface for dynamically providing option reselection in a virtual assistant communication session.

FIGS. 8-11 are screenshots of an exemplary virtual assistant user interface for dynamically providing option reselection in a virtual assistant communication session. As shown in FIG. 8, the virtual assistant application 108 of computing device 106 displays a user interface 800 with an option selection feature 804 in response to a user request message 802. In this example, the user has provided the input message 802 'I want to order food' and the virtual assistant application 108 has generated the option selection feature 804 comprising the prompt 'What would you like?' with a list of options including Beverages, Breakfast, Burgers, Combo Meal, and Cancel. The user interface 800 also includes an input feature 806 that enables the user to provide responses to the option selection feature(s). In this example, the user can provide input corresponding to one of the options in the option selection feature 804—e.g., input message 808 'Breakfast'.

Figure 9:
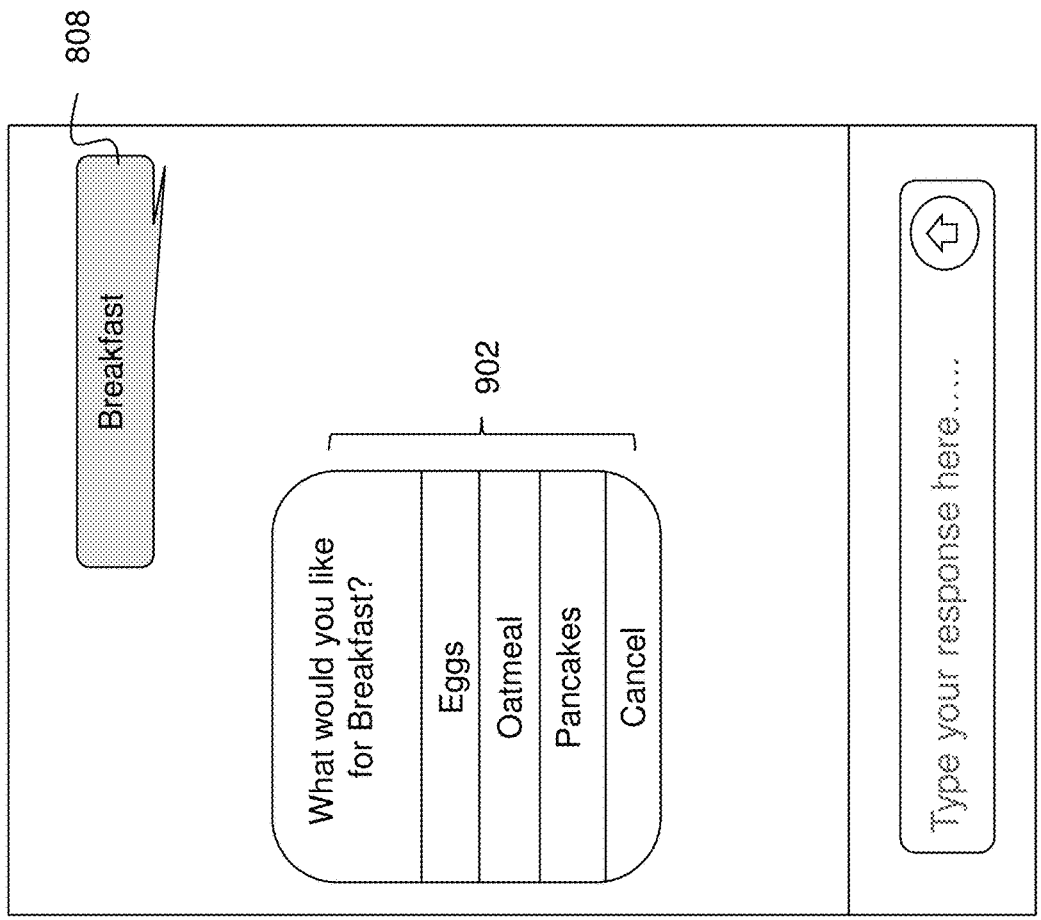

Turning to FIG. 9, in response to the user option selection, the virtual assistant application 108 initiates a second intent workflow that corresponds to the selected option. As shown in FIG. 9, the virtual assistant application 108 displays another option selection feature 902 comprising several options for selection by the user—e.g., Eggs, Oatmeal, Pancakes. At this point, the user decided that he or she does not want breakfast and prefers a different option.

Figure 10:
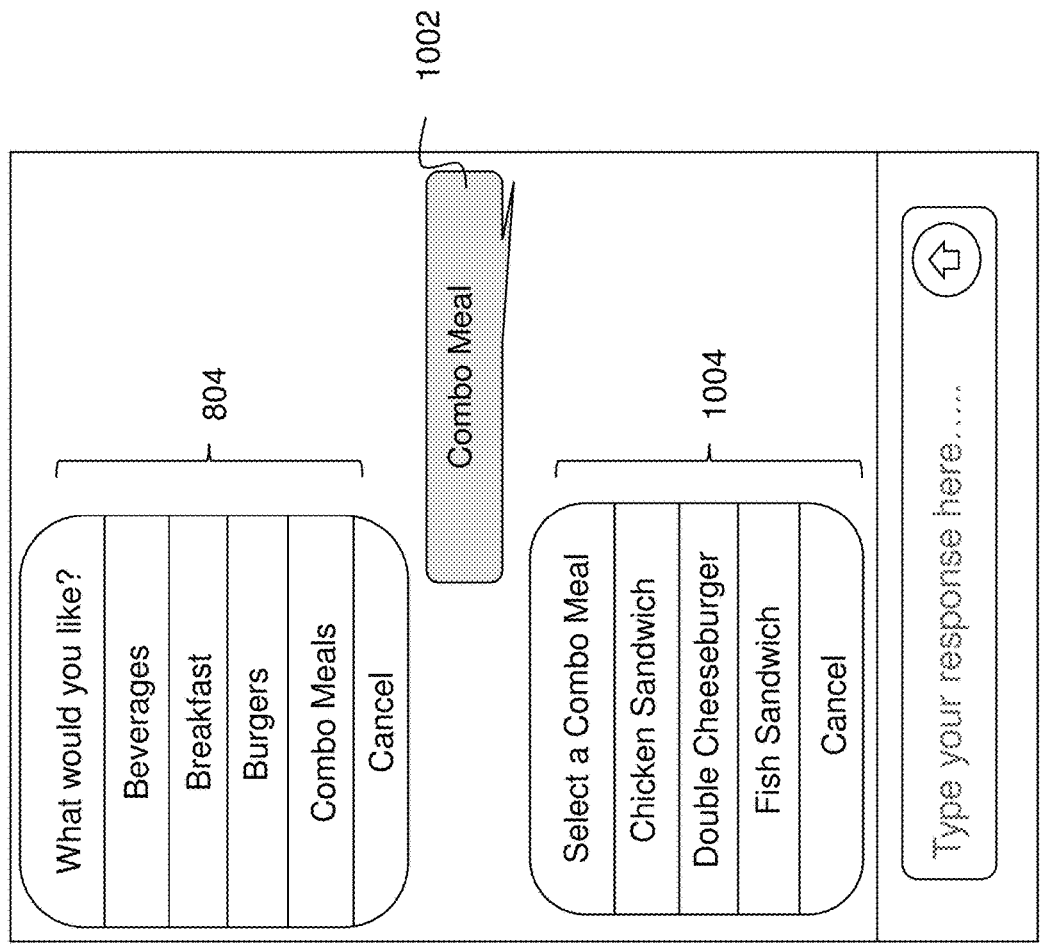
Figure 11:
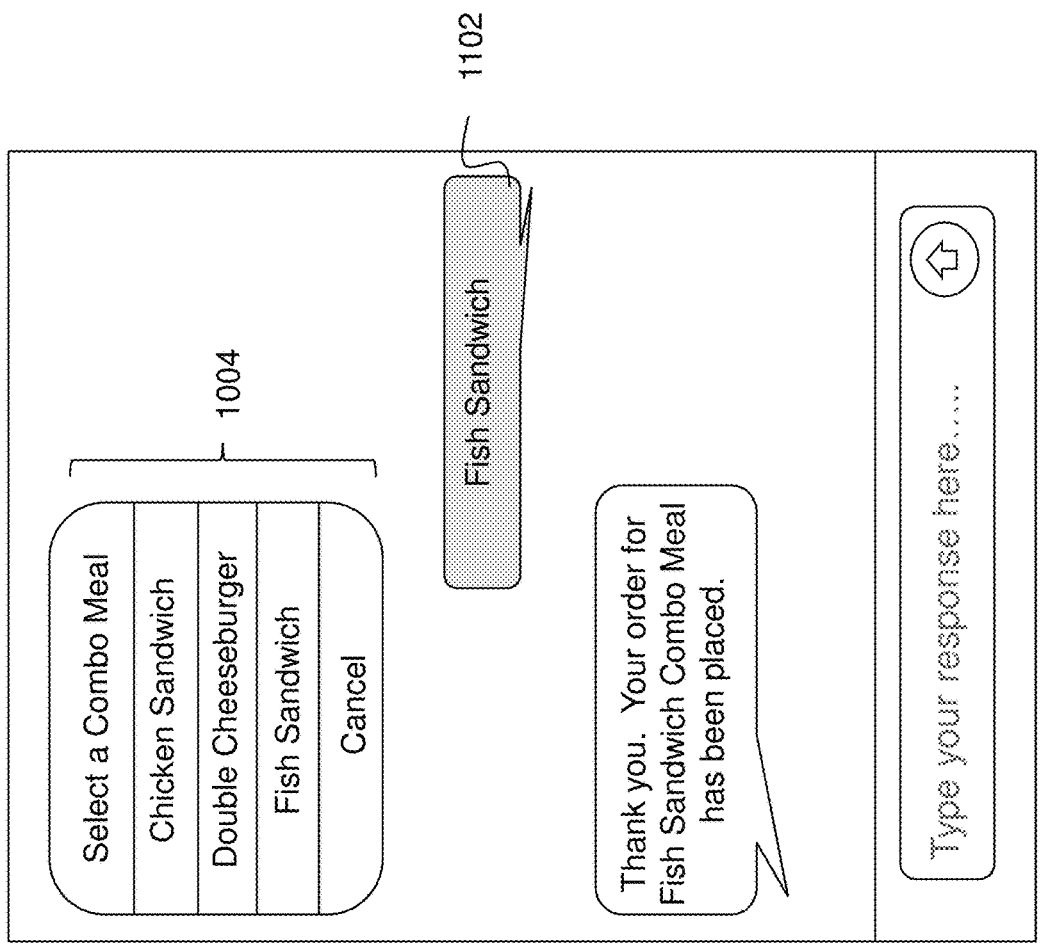

As shown in FIG. 10, the user scrolls up in the user interface to the prior option selection feature 804 and selects a different option—e.g., Combo Meals—by providing corresponding input message 1002. The virtual assistant application 108, in conjunction with the event manager 110, restores the conversation state using a reference identifier for the prior option selection feature 804 (stored in 114) and initiates a different intent workflow based upon the updated selection. As shown in FIG. 10, the virtual assistant application 108 generates another option selection feature 1004 comprising a list of options relating to the Combo Meal selection. The user then selects an option from feature 1004 by providing an input message 1102—e.g., Fish Sandwich—and the virtual assistant application 108 detects the option selection and completes the intent workflow by submitting the order.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer system for dynamic option reselection in virtual assistant communication sessions, the system comprising a computing device having a memory that stores computer-executable instructions and a processor that executes the computer-executable instructions to:
    establish a chat-based communication session between a virtual assistant application of the computing device and a remote computing device;
    capture, by the virtual assistant application, a first conversation intent generated by a user of the computing device during the chat-based communication session, wherein the first conversation intent is part of a first intent workflow;
    generate, by the virtual assistant application, an option selection feature based upon the first conversation intent, the option selection feature comprising a plurality of options and associated with a reference identifier;
    receive, by the virtual assistant application, a selection of a first one of the options in the option selection feature;
    initiate, by the virtual assistant application, a second intent workflow in response to the selected option;
    detect, by the virtual assistant application, a selection of a second one of the options in the option selection feature; and
    restore, by the virtual assistant application, the chat-based communication session to a state in the first intent workflow using the reference identifier.

2. The system of claim 1, wherein virtual assistant application is activated upon launching a parent software application and waits for the user of the computing device to interact with the virtual assistant application before establishing the chat-based communication session with the remote computing device.

3. The system of claim 2, wherein the parent software application comprises an event manager that listens for the first conversation intent.

4. The system of claim 3, when the event manager detects the first conversation intent, the event manager makes the first conversation intent available to one or more applications that are subscribed to receive the first conversation intent.

5. The system of claim 1, wherein the first intent workflow and the second intent workflow each comprises one or more conversation states that require the user of the computing device to select from a list of options.

6. The system of claim 1, wherein the option selection feature comprises a visual menu that displays the plurality of options on a screen of the computing device in a text chat window.

7. The system of claim 6, wherein the selection of a first one of the options in the option selection feature comprises a text message input by the user that that corresponds to the first one of the options in the option selection feature.

8. The system of claim 7, wherein when the text message input by the user does not correspond to any of the options in the option selection feature, the virtual assistant application redisplays the visual menu to the user.

9. The system of claim 1, wherein the option selection feature comprises one or more sound files that, when played back by the computing device, announce the plurality of options via a speaker of the computing device.

10. The system of claim 1, wherein the reference identifier uniquely identifies the option selection feature across a plurality of different intent workflows.

11. A computerized method of dynamic option reselection in virtual assistant communication sessions, the method comprising:
    establishing a chat-based communication session between a virtual assistant application of a computing device and a remote computing device;
    capturing, by the virtual assistant application, a first conversation intent generated by a user of the computing device during the chat-based communication session, wherein the first conversation intent is part of a first intent workflow;
    generating, by the virtual assistant application, an option selection feature based upon the first conversation intent, the option selection feature comprising a plurality of options and associated with a reference identifier;
    receiving, by the virtual assistant application, a selection of a first one of the options in the option selection feature;
    initiating, by the virtual assistant application, a second intent workflow in response to the selected option;
    detecting, by the virtual assistant application, a selection of a second one of the options in the option selection feature; and
    restoring, by the virtual assistant application, the chat-based communication session to a state in the first intent workflow using the reference identifier.

12. The method of claim 11, wherein virtual assistant application is activated upon launching a parent software application and waits for the user of the computing device to interact with the virtual assistant application before establishing the chat-based communication session with the remote computing device.

13. The method of claim 12, wherein the parent software application comprises an event manager that listens for the first conversation intent.

14. The method of claim 13, when the event manager detects the first conversation intent, the event manager makes the first conversation intent available to one or more applications that are subscribed to receive the first conversation intent.

15. The method of claim 11, wherein the first intent workflow and the second intent workflow each comprises one or more conversation states that require the user of the computing device to select from a list of options.

16. The method of claim 11, wherein the option selection feature comprises a visual menu that displays the plurality of options on a screen of the computing device in a text chat window.

17. The method of claim 16, wherein the selection of a first one of the options in the option selection feature comprises a text message input by the user that that corresponds to the first one of the options in the option selection feature.

18. The method of claim 17, wherein when the text message input by the user does not correspond to any of the options in the option selection feature, the virtual assistant application redisplays the visual menu to the user.

19. The method of claim 11, wherein the option selection feature comprises one or more sound files that, when played back by the computing device, announce the plurality of options via a speaker of the computing device.

20. The method of claim 11, wherein the reference identifier uniquely identifies the option selection feature across a plurality of different intent workflows.

\* \* \* \* \*